Figure 4:
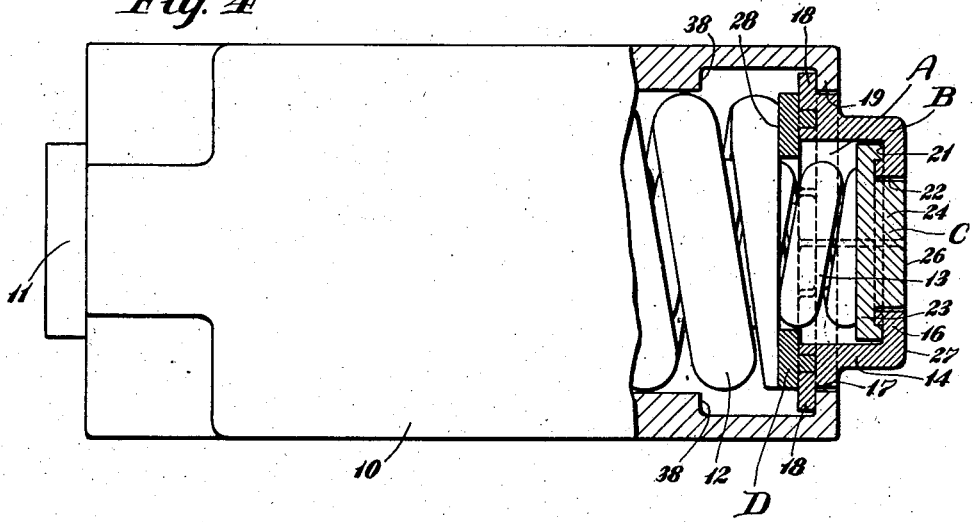

Jan. 22, 1946.  G. E. DATH  2,393,297
FRICTION SHOCK ABSORBING MECHANISM
Filed Nov. 17, 1941  2 Sheets-Sheet 1
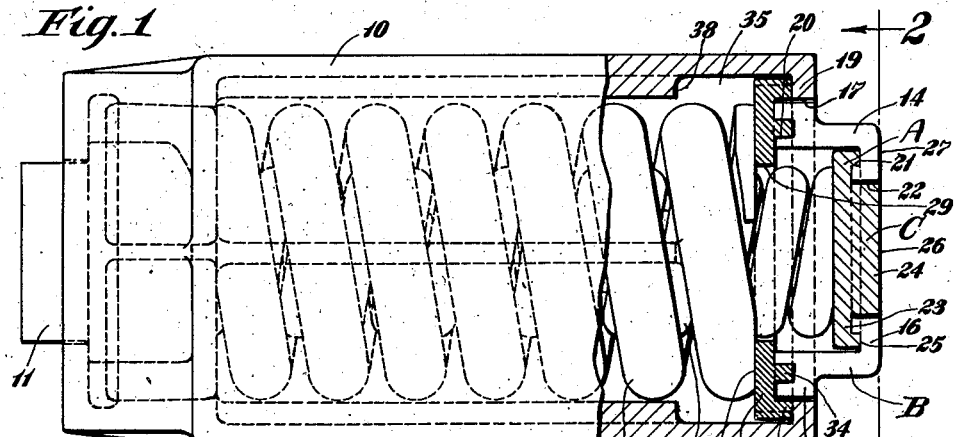
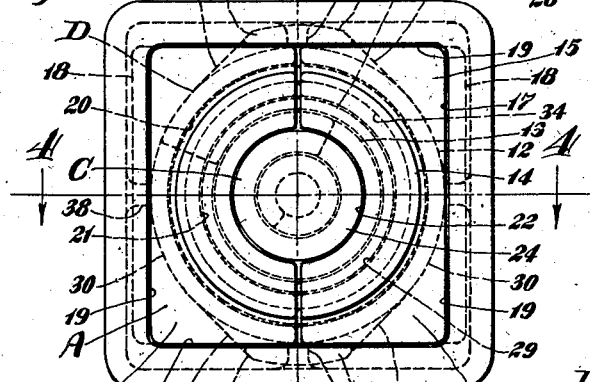
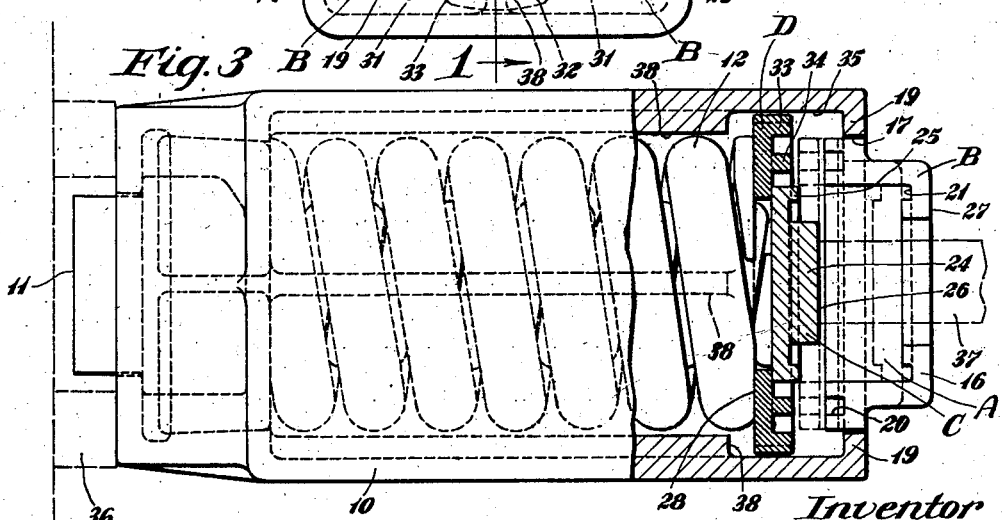
Inventor
George E. Dath
By Henry Fuchs
Atty.

Jan. 22, 1946.   G. E. DATH   2,393,297
FRICTION SHOCK ABSORBING MECHANISM
Filed Nov. 17, 1941   2 Sheets-Sheet 2

Inventor
George E. Dath
By Henry Fuchs
Atty.

Patented Jan. 22, 1946

2,393,297

UNITED STATES PATENT OFFICE 2,393,297

FRICTION SHOCK ABSORBING MECHANISM

George E. Dath, Mokena, Ill., assignor to W. H. Miner, Inc., Chicago, Ill., a corporation of Delaware Application November 17, 1941, Serial No. 419,359

2 Claims. (Cl. 267—1)

This invention relates to improvements in friction shock absorbing mechanisms, and more particularly to mechanisms of this character employing a casing having a friction shell section at one end thereof, a friction clutch comprising a wedge and shoes slidable within the shell, a spring resistance opposing inward movement of the shoes, and a movable spring cap at the other end of the casing, movement of which inwardly of the casing is opposed by the spring resistance to provide for preliminary light action.

One object of the invention is to provide in a mechanism of the character indicated in the preceding paragraph a spring cap which is readily applied and may be easily detached, wherein the cap is held anchored to the casing through the pressure exerted by the spring resistance.

A more specific object of the invention is to provide in a device of the character set forth in the preceding paragraph a spring cap composed of two sections to facilitate assembling with the casing, wherein the sections have shouldered engagement with the casing to limit outward movement of the cap and anchor the same to the casing, and wherein the cap includes locking means forming a part of the cap and held in locking engagement with the sections thereof by the action of the spring resistance of the mechanism to rigidly join the parts of the cap together.

Other objects of the invention will more clearly appear from the description and claims hereinafter following.

In the drawings forming a part of this specification, Figure 1 is a side elevational view and part longitudinal vertical sectional view of a friction shock absorbing mechanism illustrating my improvements in connection therewith, the section corresponding substantially to the line 1—1 of Figure 2. Figure 2 is a rear end elevational view of Figure 1, looking in the direction of the arrows 2—2. Figure 3 is a view similar to Figure 1, illustrating the manner of assembling the parts of the mechanism. Figure 4 is a part plan and part horizontal longitudinal sectional view of the structure shown in Figures 1 and 2, the section corresponding substantially to the line 4—4 of Figure 2.

The friction shock absorbing mechanism comprises a friction casing 10 of substantially rectangular transverse cross section at the rear end portion thereof, a friction clutch 11 slidable within the casing, and springs 12 and 13 opposing movement of the clutch. This mechanism thus far described is well-known in the art, and is similar to the corresponding parts of the mechanism illustrated in Patent No. 2,050,541, granted to R. J. Olander, August 11, 1936, and the operation thereof is similar to that of the mechanism disclosed in this patent.

The wedge block of the friction clutch is held assembled with the casing by shouldered engagement with an inturned stop flange at the open end of said casing 10 in the same manner as said Olander patent.

My improvements involve broadly a spring cap A at the rear end of the casing 10 having shouldered engagement with the latter to restrict outward movement of the cap and anchor the same to the casing, the spring cap A comprising two similar sections B—B, a plug C, and a ring D.

The sections B—B of the cap A are of similar design, each comprising a semi-cylindrical wall-like portion 14 provided with a laterally outstanding inner base flange 15, and an outer laterally inturned arc-shaped flange 16. The base flanges 15—15 proper of the two sections B—B when assembled together define a square platelike portion of square outline of slightly smaller size than the square opening 17 at the rear end of the casing 10, as clearly shown in Figures 1, 2, and 4. Along the edge of greatest length of the base of the flange 15 of each section B is provided a laterally outstanding or projecting rib portion 18 of lesser thickness than the flange 16, said rib forming a retaining lug or flange adapted to engage in back of the inturned flange 19 at the open end of the casing 10 defining the square opening 17. The flat end face of the base flange 15 of each section B has an arc-shaped groove 20 therein for a purpose hereinafter described.

On its inner side face the flange 16 has an arc-shaped groove 21 cut therein adapted to cooperate with engaging means on the plug C hereinafter described. The grooves 20 and 21 are concentric and when the cap sections B—B are assembled form, in effect, complete circular grooves. The opening between the flanges 16—16 is substantially circular, as indicated at 22.

The plug C comprises a circular disclike base portion 23 having an outstanding cylindrical enlargement or boss 24 thereon which is of lesser diameter than the base 23 and concentric therewith. The cylindrical enlargement 24 is of a size to fit the opening 22 between the flanges 16—16 with slight clearance. At its periphery the disclike base 23 has an annular outstanding rib 25, which is adapted to engage in the grooves 21—21 of the flanges 16—16 of the sections B—B. The disclike portion 23 is, in effect, a flange. The plug C fits within the sections B—B with the disclike portion fitting the inner sides of the walls 14—14 of the sections B—B and the boss 24 fitting within the opening 22 between the flanges 16—16 and having its outer face 26 flush with the outer end faces 27—27 of the sections B—B, as clearly shown in Figures 1 and 4.

The ring D has a flat inner side 28 forming an abutment for the spring 12. The opening of the ring, which is indicated by 29, is of lesser diameter than the largest diameter of the plug C but is of sufficient size to freely accommodate the inner coil 13 of the spring resistance. The outer periphery of the ring is of substantially oval contour, having curved side portions 30—30 concentric to the opening 29 as seen most clearly in Figure 2, merging with tangential side edges 31—31 at the top and bottom, as shown in said figure, and terminating in top and bottom projections 32—32 which overlap the flanges 19—19 of the casing at the inner sides of said flanges. At their extremities the projections 32—32 have arc-shaped ribs 33—33 adapted to engage the flanges 19—19 of the casing. The ribs 33—33 embrace the peripheral edge of the base portions or flanges 15—15 of the two sections B—B in overlapping relation to the adjacent ends of said flanges. Inwardly of the ribs 33—33 and concentric therewith, the ring D has on the side thereof facing the sections B—B an annular outstanding rib 34 adapted to engage within the grooves 20—20 of the flanges 15—15. As shown most clearly in Figures 1, 3, and 4, the ribs 38 of the casing 10 are cut away at the rear of the casing, thereby providing the casing with an interiorly smooth portion 35 within which the ring is guided. The outline of the ring D, as will be seen in Figure 2, is of such a shape that when it is rotated through an arc of 45° from the position shown in said figure to bring the projections in line with the two diagonally opposite corners of the casing, the ring will pass freely through the opening 17 at the rear end of the casing to permit insertion of the ring into the casing and removal therefrom.

In assembling the mechanism the friction clutch 11 and the springs 12 and 13 are first placed within the casing 10 by inserting the same through the opening 17 at the rear end of the casing. The ring D is then inserted through the opening 17, the ring having first been rotated to a position at 45° from that shown in Figure 2 in which position the same will pass freely through said opening, the extended or projected portions 32—32 of the ring being thus disposed at diagonally opposite corners of the opening. The plug C is then passed through the opening 17 and brought into abutment with the ring and forced inwardly to the position shown in Figure 3 by a tool such as a bar or plunger 37 while the casing is buttressed against a block in the form of a ring 36, shown in dotted lines in said figure. In this connection it is pointed out that the ring 36 is of greater thickness than the projection of the wedge of the clutch 11, thereby preventing the clutch from being forced inwardly during the assembling operation, so that the springs 12 and 13 are compressed only due to inward displacement of the ring D and the plug C. The two sections B—B of the cap A are then applied while in slightly tilted position so that the flanges 15—15 of the same will pass freely between and clear the flanges 19 of the casing. After the cap A has been pushed inwardly to an extent that the flanges 15—15 thereof are disposed inwardly of the flanges 19 of the casing, the sections B—B of the cap are rocked back to normal position, that is, to the position wherein the flanges 15—15 of the cap lie in a common transverse plane, thus bringing the flanges 15—15 into overlying relation to the flanges 19 of the casing. The tool 37 is then withdrawn permitting the springs 12 and 13 to expand, thus forcing the ring D and plug C outwardly against the sections B—B of the cap and engaging the ribs 34 of the ring D within the grooves 20—20 of the flanges 15—15 and the rib 25 of the plug within the grooves 21—21 of the flanges 16—16 of the sections B—B, and forcing the lugs 18—18 of the flanges of the sections B—B against the retaining flanges 19 of the casing. The parts of the cap A are thus locked together as a unit, the inner spring 13 which extends through the opening of the ring D holding the plug C seated and the outer spring coil 12 which bears on the ring D holding the latter seated. In this connection it is pointed out that the interengaging ribs and grooves on the ring D, plug C, and sections B—B of the cap hold both of these sections of the cap against tilting when an eccentric load is applied to the cap, thus preventing accidental displacement of these sections with respect to the retaining flanges 19 of the casing to an extent which might result in disengagement of the parts.

When the mechanism has been completely assembled, outward movement of the cap is limited by engagement of the flange portions 15—18 thereof with the retaining flanges 19 of the casing.

The spring cap A may be readily removed when for any reason it is found desirable to take the gear apart, the plug C and the ring D being forced inwardly by the tool 37 engaged through the opening of the sections B—B of the cap until there is sufficient clearance to permit the sections B—B to be tilted to an extent to disengage the flanges thereof from the retaining flanges of the casing.

I have herein shown and described what I now consider the preferred manner of carrying out my invention, but the same is merely illustrative and I contemplate all changes and modifications that come within the scope of the claims appended hereto.

I claim:

1. In a shock absorbing mechanism, the combination with a casing having an open end provided with inturned stop flanges at said open end; of a spring cap slidable within said casing, said cap including a transversely split cup-shaped element comprising two like sections, said element extending through said open end and outwardly thereof, the sections of said split element respectively having flanges in shouldered engagement with the stop flanges to limit outward movement of said element, and a plug engaged within said cup-shaped split element, the flanges of said cup-shaped element being displaced toward each other when said sections are tilted one with respect to the other, whereby said flanged end of the cap is contractible to pass freely between the stop flanges of the casing to permit insertion of the flanged end of said cap through said open end of the casing in assembling the mechanism, said plug interfitting with said cap to hold the sections thereof against relative tilting when the mechanism is completely assembled; and spring means within the casing yieldingly opposing inward movement of said cap including a spring element yieldingly holding said plug engaged with said cup-shaped element.

2. In a shock absorbing mechanism, the combination with a casing having an open end provided with interior stop shoulders at said open end; of a spring cap comprising a transversely split sectional cuplike member composed of two like sections having shouldered engagement at the inner end of said cap with said stop shoulders, a plug seated in said cuplike member, and a ring bearing on the inner end of the sections of the cuplike member, said sections of the cuplike member and ring having interlocking grooves and ribs, and said plug and cap sections having interlocking grooves and ribs, the shouldered inner end portion of said cap being contracted when said sections are tilted one with respect to the other to permit said inner end of the cap to pass freely between the stop shoulders of the casing to permit insertion of said end of the cap through the open end of the casing in assembling the mechanism; a central spring element within the casing extending through the ring and bearing on said plug; and a spring surrounding said central spring and bearing on said ring.

GEORGE E. DATH.